United States Patent Office 3,268,407
Patented August 23, 1966

3,268,407
TRANQUILIZING COMPOSITIONS AND METHOD OF INDUCING A STATE OF TRANQUILITY
Corris Mabelle Hofmann, Ho-Ho-Kus, N.J., assignor to American Cyanamid Company, Stamford, Conn., a corporation of Maine
No Drawing. Continuation of application Ser. No. 60,544, Oct. 5, 1960. This application Oct. 4, 1963, Ser. No. 313,764
20 Claims. (Cl. 167—65)

This application is a continuation of my copending application Serial No. 60,544 filed October 5, 1960 which, in turn, is a continuation-in-part of my application Serial No. 850,076, filed November 2, 1959, both of which are now abandoned.

This invention relates to novel compositions of matter useful for inducing a state of tranquility in mammals. More particularly, it relates to therapeutic compositions containing N - substituted - 3,4,5 - trimethoxycinnamamides which operate to produce a tranquilizing effect in animals with minimum side effects. The invention includes the new compositions of matter and methods of inducing a state of tranquility in mammals therewith.

My invention is based upon the discovery that certain N-substituted-3,4,5-trimethoxycinnamamides possess desirable pharmacological properties and, in particular, are capable of producing a tranquilizing effect in mammals with minimum side effects. The N-substituted-3,4,5-trimethoxycinnamamides of the present invention may be represented by the following general formula:

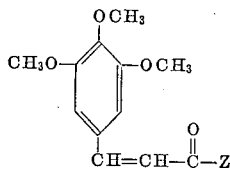

wherein Z is anilino, N-methylcyclohexylamino, 2,6-dimethylmorpholino, N - methylanilino, 3 - methoxypropylamino, piperidino, 1,2,5,6-tetrahydropyridino, allylamino or 2-methoxyethylamino.

The N-substituted-3,4,5-trimethoxycinnamamides, the active ingredients of the novel composition of the present invention, may be readily prepared by the interaction of a 3,4,5-trimethoxycinnamoyl halide with the appropriate amine. The conversion of 3,4,5-trimethoxycinnamic acid to the corresponding 3,4,5-trimethoxycinnamoyl halide may be carried out by means of various reagents. For this purpose there may be used phosphorus trichloride, phosphorus tribromide, phosphorus pentachloride, phosphorus pentabromide, phosphorus oxychloride, phosphorus oxybromide, sulfuryl chloride, thionyl chloride, or thionyl bromide. However, I prefer to use thionyl chloride for the preparation of the corresponding intermediate 3,4,5-trimethoxycinnamoyl chloride. The reaction may be carried out at temperatures ranging from about 15° C. to about 100° C. in the absence of a solvent or in a solvent which will not enter into the reaction under the conditions employed. Such solvents may be, for example, diethyl ether, chloroform, carbon tetrachloride, VMP naptha, or benzene. The resulting cinnamoyl halide is then treated with the appropriate amine, such as aniline, N - methylcyclohexylamine, 2,6 - dimethylmorpholine, N-methylaniline, 3-methoxypropylamine, piperidine, 1,2,5,6-tetrahydropyridine, allylamine or 2-methoxyethylamine whereby the corresponding 3,4,5-trimethoxycinnamamide is obtained. This reaction may be carried out at temperatures ranging from about 15° C. to about 50° C. Since this reaction is exothermic, it is preferred to carry out the reaction in a solvent or a solvent pair which will not enter into the reaction under the conditions employed. Solvents which may be used, for example, are diethyl ether, chloroform, carbon tetrachloride, VMP naphtha, or benzene. Solvent pairs which may be used, for example, are diethyl ether-water, chloroform-water, or benzene water.

The N-substituted-3,4,5-trimethoxycinnamamides, the active ingredients of the novel compositions of the present invention, may be orally administered in any of the usual unit forms of pharmaceutical preparations. These may take the form of tablets, capsules, pills, powders or any other desirable form in the therapeutic quantities set forth below. The unit form may be for a single therapeutic dose or in smaller units for multiple doses or in larger units for division into single doses. It is understood that in addition to the actvie therapeutic compound there may be present excipients, binders, fillers and other therapeutically inert ingredients necessary in the formulation of pharmaceutical preparations.

The N-substituted-3,4,5-trimethoxycinnamamides may also be administered parenterally by dissolving or suspending the compound in a parenterally suitable vehicle such as, for example, propylene glycol or polyethylene glycol, or by dissolving or suspending the compound in an aqueous solution of such vehicle.

The dosage of the N-substituted-3,4,5-trimethoxycinnamamides required to produce a tranquilizing effect without noticeable toxic side effects varies between about 50 mg. and 500 mg. per individual dose. The dosage regimen may be adjusted to provide the optimum therapeutic response. For example, several doses may be administered daily, or the dose may be proportionately reduced as indicated by the exigencies of the therapeutic situation.

The following examples illustrate the preparation and formulation of the therapeutic compounds of the present invention and the method of administering them.

Example 1.—3,4,5-trimethoxycinnamoyl chloride

In 50 parts of thionyl chloride was dissolved 7 parts of 3,4,5-trimethoxycinnamic acid and the solution was refluxed for 2 hours on a steam bath. The excess thionyl chloride was removed under vacuum whereby there was obtained crude crystalline 3,4,5-trimethoxycinnamoyl chloride, M.P. 93–95° C.

Example 2.—N-phenyl-3,4,5-trimethoxycinnamamide

A solution of 1 mole of 3,4,5-trimethoxycinnamoyl chloride in 50 ml. of chloroform was added with stirring to a solution of 2 moles of aniline in 50 ml. of chloroform and the resulting reaction mixture was allowed to stand at room temperature for 20 hours. The solid which separated was removed by filtration, washed with chloroform and discarded. The combined filtrate and washing was concentrated and the product was crystallized from the chloroform solution by the addition of petroleum ether whereby there was obtained white crystalline N-phenyl-3,4,5-trimethoxycinnamamide, M.P. 123–124° C.

*Examples 3–10*

The procedure of Example 2 was repeated but 2 moles of the amines listed in Table I below were substituted in place of aniline. The product in each case were white crystalline solids whose melting points are shown in Table I below.

TABLE I

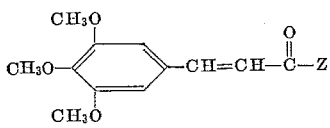

| Ex. No. | Amine used | Z | Melting point, °C. |
|---|---|---|---|
| 3 | Methylcyclohexylamine. | —N(CH$_3$)(C$_6$H$_{11}$) | 118–119 |
| 4 | 2,6-dimethylmorpholine. | —N(CH$_2$—CH(CH$_3$))$_2$O | 118–119 |
| 5 | Methylaniline. | —N(CH$_3$)(C$_6$H$_5$) | 106.5–107.5 |
| 6 | 3-methoxypropylamine. | —NHCH$_2$CH$_2$CH$_2$OCH$_3$ | 116–117 |
| 7 | Piperidine. | —N(CH$_2$—CH$_2$)$_2$CH$_2$ | 101–102 |
| 8 | 1,2,5,6-tetrahydropyridine. | —N(CH$_2$—CH)$_2$ (CH=CH) | 126–128 |
| 9 | Allylamine. | —NHCH$_2$CH=CH$_2$ | 147–149 |
| 10 | 2-methoxyethylamine. | —NHCH$_2$CH$_2$OCH$_3$ | 117–118 |

*Example 11.—Tranquilizing activity of the N-substituted-3,4,5-trimethoxycinnamamides in mice*

The quantitative determination of reduced motor activity in mice was carried out according to the method of W. D. Gray et al., Archives Internationales de Pharmacodynamie et de Therapie, vol. 125, p. 101 (1960), and W. D. Gray, A. C. Osterberg and C. E. Rauh, Archives Internationales de Pharmacodynamie et de Therapie, vol. 134, 1958 (1961). The N-substituted-3,4,5-trimethoxycinnamamides were administered orally at three or more dose levels to groups of five mice each. Spontaneous locomotor activity for these groups was then measured for a period of 5 minutes (30 minutes after administration) by an actophotometer, a photoelectric device for quantitatively recording activity. An estimation of the ED$_{50}$ (the effective dose which reduces motor activity by 50% from controls in 50% of the animals) was then obtained. An oral dose which causes lethality in a small percentage of mice was also determined. The results of these tests with the N-substituted-3,4,5-trimethoxycinnamamides of the present invention are summarized in Table II below.

TABLE II

| Compound | ED$_{50}$ for Reduced Motor Activity, mg./kg., orally | Lethal dose, mg./kg., orally |
|---|---|---|
| N-phenyl-3,4,5-trimethoxycinnamamide | 30 | 750 |
| N-methyl-N-cyclohexyl-3,4,5-trimethoxycinnamamide | 35 | 1,000 |
| N-(3,4,5-trimethoxycinnamoyl)-2,6-dimethylmorpholine | 40 | 1,500 |
| N-methyl-N-phenyl-3,4,5-trimethoxycinnamamide | 40 | 1,500 |
| N-(3-methoxypropyl)-3,4,5-trimethoxycinnamamide | 40 | 1,500 |
| N-(3,4,5-trimethoxycinnamoyl)piperidine | 45 | 1,500 |
| N-(3,4,5-trimethoxycinnamoyl)-1,2,5,6-tetrahydropyridine | 45 | 1,000 |
| N-allyl-3,4,5-trimethoxycinnamamide | 50 | 1,500 |
| N-(2-methoxyethyl)-3,4,5-trimethoxycinnamamide | 55 | 1,000 |

What is claimed is:

1. A therapeutic composition in dosage unit form comprising from about 50 mg. to about 500 mg. per dosage unit of a compound of the formula:

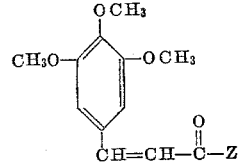

wherein Z is selected from the group consisting of anilino, N-methylcyclohexylamino, 2,6-dimethylmorpholino, N-methylanilino, 3-methoxypropylamino, piperidino, 1,2,5,6-tetrahydropyridino, allylamino and 2-methoxyethylamine and pharmaceutical carrier.

2. A therapeutic composition in dosage unit form comprising from about 50 mg. to about 500 mg. per dosage unit of N-phenyl-3,4,5-trimethoxycinnamamide and pharmaceutical carrier.

3. A therapeutic composition in dosage unit form comprising from about 50 mg. to about 500 mg. per dosage unit of N-methyl-N-cyclohexyl-3,4,5-trimethoxycinnamamide and pharmaceutical carrier.

4. A therapeutic composition in dosage unit form comprising from about 50 mg. to about 500 mg. per dosage unit of N-(3,4,5-trimethoxycinnamoyl)-2,6-dimethylmorpholine and pharmaceutical carrier.

5. A therapeutic composition in dosage unit form comprising from about 50 mg. to about 500 mg. per dosage unit of N-methyl-N-phenyl-3,4,5-trimethoxycinnamamide and pharmaceutical carrier.

6. A therapeutic composition in dosage unit form comprising from about 50 mg. to about 500 mg. per dosage unit of N-(3-methoxypropyl)-3,4,5-trimethoxycinnamamide and pharmaceutical carrier.

7. A therapeutic composition in dosage unit form comprising from about 50 mg. to about 500 mg. per dosage unit of N-(3,4,5-trimethoxycinnamoyl)piperidine and pharmaceutical carrier.

8. A therapeutic composition in dosage unit form comprising from about 50 mg. to about 500 mg. per dosage unit of N-(3,4,5-trimethoxycinnamoyl)-1,2,5,6-tetrahydropyridine and pharmaceutical carrier.

9. A therapeutic composition in dosage unit form comprising from about 50 mg. to about 500 mg. per dosage unit of N-allyl-3,4,5-trimethoxycinnamamide and pharmaceutical carrier.

10. A therapeutic composition in dosage unit form comprising from about 50 mg. to about 500 mg. per dosage unit of N-(2-methoxyethyl)-3,4,5-trimethoxycinnamamide and pharmaceutical carrier.

11. A method for inducing a state of tranquility in mammals which comprises administering to a mammal from about 50 mg. to about 500 mg. of a compound of the formula:

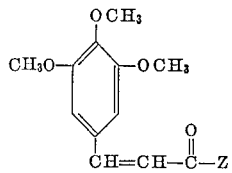

wherein Z is selected from the group consisting of anilino, N-methylcyclohexylamino, 2,6-dimethylmorpholino, N-methylanilino, 3-methoxypropylamino, piperidino, 1,2,5,6-tetrahydropyridino, allylamino and 2-methoxyethylamino.

12. A method for inducing a state of tranquility in mammals which comprises administering to a mammal from about 50 mg. to about 500 mg. of N-phenyl-3,4,5-trimethoxycinnamamide.

13. A method for inducing a state of tranquility in mammals which comprises administering to a mammal from about 50 mg. to about 500 mg. of N-methyl-N-cyclohexyl-3,4,5-trimethoxycinnamamide.

14. A method for inducing a state of tranquility in mammals which comprises administering to a mammal from about 50 mg. to about 500 mg. of N-(3,4,5-trimethoxycinnamoyl)-2,6-dimethylmorpholine.

15. A method for inducing a state of tranquility in mammals which comprises administering to a mammal from about 50 mg. to about 500 mg. of N-methyl-N-phenyl-3,4,5-trimethoxycinnamamide.

16. A method for inducing a state of tranquility in mammals which comprises administering to a mammal from about 50 mg. to about 500 mg. of N-(3-methoxypropyl-3,4,5-trimethoxycinnamamide.

17. A method for inducing a state of tranquility in mammals which comprises administering to a mammal from about 50 mg. to about 500 mg. of N-(3,4,5-trimethoxycinnamoyl)piperindine.

18. A method for inducing a state of tranquility in mammals which comprises administering to a mammal from about 50 mg. to about 500 mg. of N-(3,4,5-trimethoxycinnamoyl)-1,2,5,6-tetrahydropyridine.

19. A method for inducing a state of tranquility in mammals which comprises administering to a mammal from about 50 mg. to about 500 mg. of N-allyl-3,4,5-trimethoxycinnamamide.

20. A method for inducing a state of tranquility in mammals which comprises administering to a mammal from about 50 mg. to about 500 mg. of N-(2-methoxyethyl)3,4,5-trimethoxycinnamamide.

References Cited by the Examiner
UNITED STATES PATENTS

| | | | |
|---|---|---|---|
| 2,948,754 | 8/1960 | Litvan et al. | 260—294.7 |
| 2,951,078 | 8/1960 | Biel | 260—294.7 |
| 2,987,544 | 6/1961 | Horrom | 260—559 |

JULIAN S. LEVITT, *Primary Examiner.*

NORRIS G. MANN, STANLEY J. FRIEDMAN,
*Assistant Examiners.*